(12) United States Patent
Ioki et al.

(10) Patent No.: US 7,355,658 B2
(45) Date of Patent: Apr. 8, 2008

(54) IMAGE DISPLAY UNIT AND GAME MACHINE

(75) Inventors: Sadao Ioki, Kiryu (JP); Sanji Arisawa, Joetsu (JP); Seijiro Tomita, Komae (JP)

(73) Assignees: Sophia Inc., Gunma (JP); Arisawa Mfg. Co., Ltd., Niigata (JP); Amita Technologies Inc., Tokyo (JP)

( * ) Notice: Subject to any disclaimer, the term of this patent is extended or adjusted under 35 U.S.C. 154(b) by 230 days.

(21) Appl. No.: 10/548,366

(22) PCT Filed: Feb. 20, 2004

(86) PCT No.: PCT/JP2004/002042

§ 371 (c)(1),
(2), (4) Date: Sep. 9, 2005

(87) PCT Pub. No.: WO2004/081641

PCT Pub. Date: Sep. 23, 2004

(65) Prior Publication Data

US 2006/0209231 A1    Sep. 21, 2006

(30) Foreign Application Priority Data

Mar. 12, 2003    (JP) .............................. 2003-066327

(51) Int. Cl.
G02F 1/1335    (2006.01)

(52) U.S. Cl. .............................. 349/15; 349/61; 349/68
(58) Field of Classification Search .................. 349/15, 349/96, 61, 68
See application file for complete search history.

(56) References Cited

U.S. PATENT DOCUMENTS

| 5,103,332 | A | * | 4/1992 | Kaneko et al. ................ 349/20 |
| 5,349,379 | A | | 9/1994 | Eichenlaub |
| 5,410,345 | A | | 4/1995 | Eichenlaub |
| 5,428,366 | A | | 6/1995 | Eichenlaub |
| 5,541,745 | A | * | 7/1996 | Fergason .................... 349/194 |
| 2003/0001797 | A1 | | 1/2003 | Sato et al. |

(Continued)

FOREIGN PATENT DOCUMENTS

CA    2 143 617    2/2004

(Continued)

*Primary Examiner*—Andrew Schechter
*Assistant Examiner*—John Heyman
(74) *Attorney, Agent, or Firm*—Sughrue Mion, PLLC

(57) ABSTRACT

An image display in which, even when an observer moves vertically in a position viewing an image, a bright image is obtained. There are provided a liquid-crystal display panel (804) capable of transmitting light projected from backward, a light source (801) for projecting a first light as a particular polarization of light and a second light orthogonal in polarization axis to the first light to the liquid-crystal display panel (804), and a stripe-patterned filter (802) arranged between the liquid-crystal display panel (804) and the light source (801) and having, repeatedly in a given direction, first areas for transmitting the first light and second areas for transmitting the second light. The light source is structured by including light emitters (810) for emitting red, green and blue lights, to sequentially emit red, green and blue lights from the light emitters (810). Images, corresponding to respective colors, are sequentially displayed on the liquid-crystal display panel (804) correspondingly to emission timing of the respective colors of light by the light emitters (810).

3 Claims, 10 Drawing Sheets

U.S. PATENT DOCUMENTS

2003/0058385 A1* 3/2003 McKnight et al. ............ 349/96
2003/0227450 A1 12/2003 Satoh et al.

FOREIGN PATENT DOCUMENTS

| | | |
|---|---|---|
| CN | 1464988 A | 12/2003 |
| DE | 69328371 E | 10/2000 |
| EP | 0 659 324 B1 | 4/2000 |
| EP | 1 394 594 A1 | 3/2004 |
| JP | 05-237233 | 9/1993 |
| JP | 07-031729 | 2/1995 |
| JP | 07-178223 | 7/1995 |
| JP | 8-505014 A | 5/1996 |
| JP | 09-113862 | 5/1997 |
| JP | 09-211419 | 8/1997 |
| JP | 10-063199 | 3/1998 |
| JP | 10-268805 | 10/1998 |
| JP | 2002-365593 | 12/2002 |
| JP | 2003-044016 | 2/2003 |
| KR | 2003-0027944 | 4/2003 |
| WO | WO 94/06249 A1 | 3/1994 |
| WO | WO 01/59509 A1 | 8/2001 |
| WO | WO 02/101445 A1 | 12/2002 |

* cited by examiner

| SCAN COUNTER | BACKLIGHT | IMAGE DATA |
|---|---|---|
| 0 | RED ON | RED COMPONENT |
| 1 | OFF | ALL PIXELS OFF |
| 2 | GREEN ON | GREEN COMPONENT |
| 3 | GREEN ON | GREEN COMPONENT |
| 4 | OFF | ALL PIXELS OFF |
| 5 | BLUE ON | BLUE COMPONENT |
| 6 | BLUE ON | BLUE COMPONENT |
| 7 | OFF | ALL PIXELS OFF |

ABOVE CONTEXT: US 7,355,658 B2

IMAGE DISPLAY UNIT AND GAME MACHINE

TECHNICAL FIELD

The present invention relates to image displays, and more particularly to three-dimensional image display that allows the observer to make a stereoscopic viewing without wearing special spectacles.

BACKGROUND ART

Conventionally, the three-dimensional image display is arranged with a right-eye polarizing filter and a left-eye polarizing filter that are orthogonal in polarizing directions in front left and right of its right source, to turn those of light passed the filters into collimated light by means of a Fresnel lens and illuminate it to the liquid-crystal display. The polarizing filters, on both sides of the liquid-crystal display, are alternately arranged with linear polarizing filter lines whose polarization axes are orthogonal to each other. Furthermore, the opposing linear polarizing filter lines, at the light-source side and at the observer side, are provided orthogonal in polarizing directions. The liquid-crystal display has a liquid-crystal panel structured to alternately display pieces of video information for right-eye and left-eye every horizontal line in a manner matched to the light-transmission lines of the two polarizing filters. Meanwhile, the polarizing filter on the light-source side is arranged alternately with linear filter lines whose polarization axes are orthogonal to each other. The polarizing filter on the observation side is made as a linear straight-line polarizing filter having one linear polarizing filter lines of the light-source-side polarizing filter. On the liquid-crystal panel of the liquid-crystal display, pieces of video information for right-eye and left-eye are to be alternately displayed every horizontal line in a manner matched to the light-transmission lines of the light-source-side polarizing filter (e.g. see Patent Document 1).

Meanwhile, in the case the ball successfully enters a predetermined winning pocket, numerals, symbols, graphic patterns, etc. are variably displayed on drums or windows arranged nearly centrally of a pachinko board. In the case the same numerals are completed into stop, a big win is gained to return a predetermined number of balls. The image, to be displayed on the display for variable display or so, is a planar two-dimensional image. However, in order to enhance the display effect furthermore, there is proposed a game machine for displaying a planar image as a stereoscopic image by providing corresponding pieces of image information to the left and right eyes through use of a lenticular lens having a sharp directivity (see Patent Document 2, for example)

[Patent Document 1]

JP-A-10-63199

[Patent Document 2]

JP-A-7-31729

However, in the conventional image display, because left-eye image and right-eye image are separately set up every horizontal line of the liquid crystal display panel, there exists a pixel region not to reach the eye of the observer every horizontal line. As a result, there is a problem that pixel skipping occurs over image display entirety, not allowing the observer to view an image with clarity.

DISCLOSURE OF THE INVENTION

It is an object of the present invention to provide an image display capable, for the observer, of obtaining a bright, clear image fine in the number of pixels, in the three-dimensional image display allowing the observer to make a stereoscopic viewing without the need to wear special spectacles.

The first invention is an image display comprising: a liquid-crystal display panel capable of transmitting light projected from the rear; a light source for projecting a first one of light as a particular polarization of light and a second one of light orthogonal in polarization axis to the first light to the liquid-crystal display panel; optical means for refracting light emitted from the light source into directions to reach left and right respective eyes; a stripe-patterned filter arranged between the liquid-crystal display panel and the light source and having, repeatedly in a given direction, first areas for transmitting the first light and second areas for transmitting the second light; a polarizing plate having a polarizing characteristic to cut off light transmitting through the liquid-crystal display panel in any of during supplying of power or during non-supplying of power to the liquid-crystal display panel; wherein the light source is structured by including light emitters for emitting red, green and blue lights, to sequentially emit red, green and blue lights from the light emitters, images corresponding to respective colors being sequentially displayed on the liquid-crystal display panel correspondingly to emission timing of the respective colors of light by the light emitters, the light emitter being structured by arranging light-emitting elements individually based on each of the colors, wherein the light-emitting elements are for emitting red, green and blue lights refracted at different angles, respectively, toward the optical means, and wherein the light-emitting elements for emitting red, green and blue lights are, respectively, arranged at smaller angles relative to the centerline of the image display.

The second invention is characterized, in the first invention, that emission time of each color of light by the light source is dependent on the brightness of each color.

The third invention is a game machine having an image display provided with a display area for variably displaying a plurality of pieces of identification information, and variable display control means for control of variable display of the identification information, to perform a variable display game that the identification information displayed on the image display is variably displayed to cause a special game state for providing a special game value related to a result form of the variable display game, wherein the image display uses an image display according to the first or the second invention.

In the first invention, an image display comprising: a liquid-crystal display panel capable of transmitting light projected from the rear; a light source for projecting a first light as a particular polarization of light and a second light orthogonal in polarization axis to the first light to the liquid-crystal display panel; optical means for refracting light emitted from the light source into directions to reach left and right respective eyes; a stripe-patterned filter arranged between the liquid-crystal display panel and the light source and having, repeatedly in a given direction, first areas for transmitting the first light and second areas for transmitting the second light; a polarizing plate having a polarizing characteristic to cut off light transmitting through the liquid-crystal display panel in any of during supplying of power or during non-supplying of power to the liquid-crystal display panel; wherein the light source is structured by including light emitters for emitting red, green and blue lights, to sequentially emit red, green and blue lights from the light emitters, and images corresponding to respective colors being sequentially displayed on the liquid-crystal display panel correspondingly to emission timing of the respective colors of light by the light emitters. Accordingly, because the light emitters are to emit light in different timing without the possibility to emit light simultaneously, it is possible to suppress heat generating at one time period. Meanwhile, because the first light source and the second light source emit different colors of light, there is no need to provide a color filter on the liquid-crystal display panel thus making the pixel pitch smaller. By size-reducing the pixels, fringe occurrence can be suppressed in a stereoscopic image.

Meanwhile, the light emitters are individually arranged with light-emitting elements based on each of the colors. Accordingly, color decomposition and combining is facilitated for a display image.

Meanwhile, the light-emitting elements are to emit light refracted at mutually different angles by the optical means, and arranged at small angle closer to the centerline of the image display. Accordingly, the light emitters for respective colors are arranged by taking account of the wavelength of light emitted from the light source. By using the common Fresnel lens, the light from the light emitters for respective colors can be made reach the left and right eyes.

In the second invention, the emission time of each color of light by the light source is provided different corresponding to a brightness of the color. Accordingly, in case where the light emitters are different in luminous intensity as to respective colors, the light intensities of respective colors can be made equal in average-over-time, enabling for efficient display control.

In the third invention, a game machine has an image display provided with a display area for variably displaying a plurality of pieces of identification information, and variable display control means for control of variable display of the identification information, to perform a variable display game that the identification information displayed on the image display is variably displayed to cause a special game state for providing a special game value related to a result form of the variable display game, wherein the image display uses an image display according to the first or the second invention. Accordingly, it is possible to play a variable display game using a clear stereoscopic image based on fine pixels.

BEST MODE FOR CARRYING OUT THE INVENTION

Hereunder, embodiments of the present invention will be explained based on the drawings.

Figure 1:
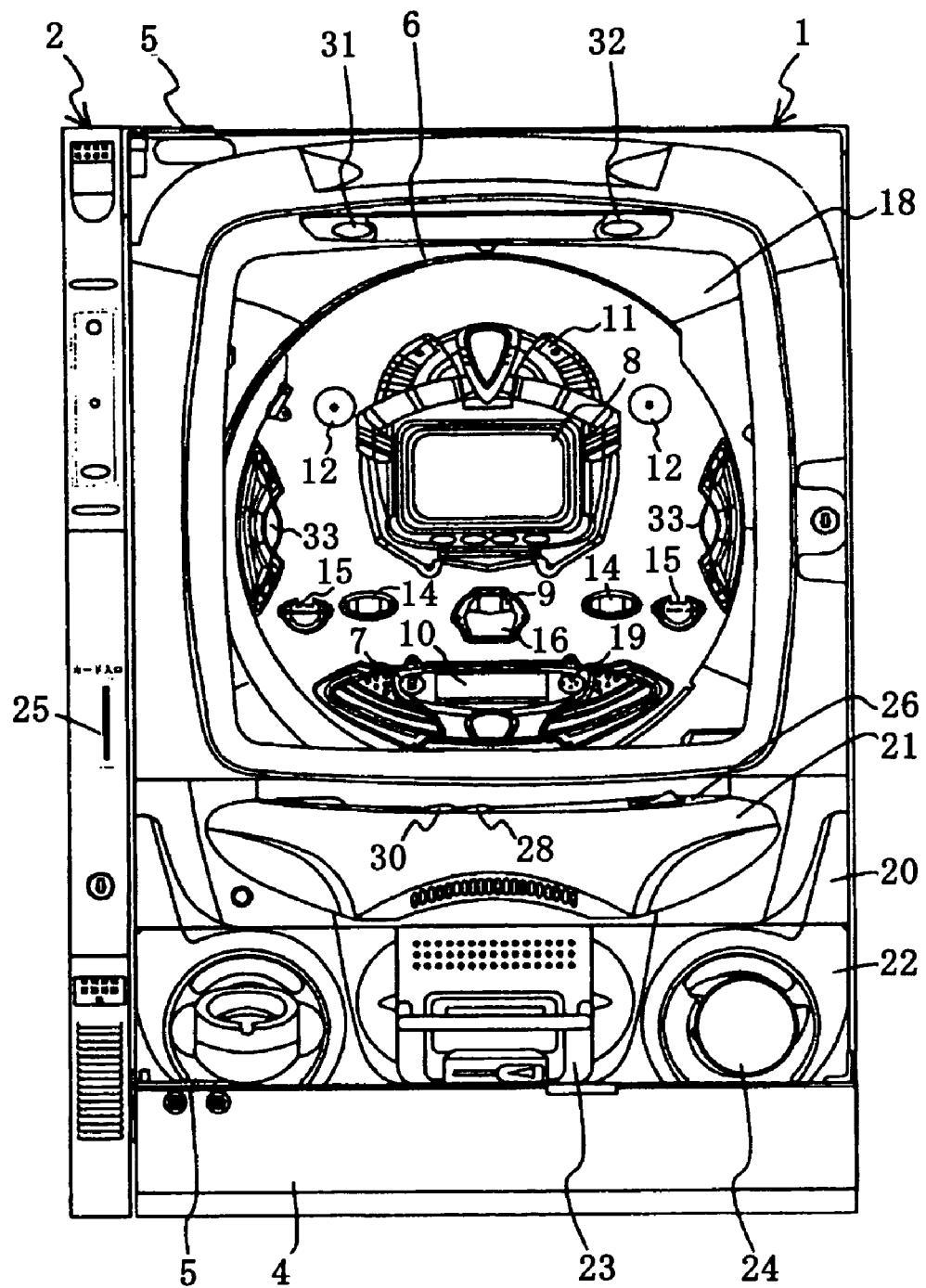
FIG. 1 is a front view showing a construction of a game machine overall in an embodiment of the present invention.

FIG. 1 is a front view showing the overall construction of a game machine (CR machine provided with a card-based ball lease unit) in an embodiment of the invention.

The game machine (pachinko machine) 1 has a front frame 3 assembled with a hinge 5 to rotate to open and close on a main frame (exterior frame) 4. A game board 6 is received in an accommodation frame attached on a back surface of the front frame 3.

The game board 6 is formed with a playfield surrounded by a guide rail, on a surface thereof. In nearly the center of the play field a center case 11 is arranged to provide an image display (special-pattern display) 8. Lower part of the playfield, there is arranged a variable prizewinning player 10 having a high-prize trap. Besides, in the playfield, there are arranged a prize traps 12-15, a start trap 16, an ordinary-pattern display 7, an ordinary variable prizewinning player 9, etc. The front frame 3 is attached with a cover glass 18 as a front structural member covering the game board 6 in the front thereof.

The image display 8 has a display screen structured by an LCD (liquid-crystal display). The display screen has an area for image display (display area) having a plurality of variable display areas so that the variable display areas can display therein identification information (special pattern, ordinary pattern) and characters for appearing in a variable display game. Namely, in the variable display areas provided in the left, middle and right of the display area, patterns assigned as identification information (e.g. 12 patterns, "0" to "9" numerals and alphabets of "A" and "B") are to be variably displayed, thus effecting a variable display game. Besides, an image based on game progress is displayed on the display screen.

Lower part of the image display 8, there is arranged a start trap 16 having an ordinary variable prizewinning player (ordinary electric scoring element) 9. In left and right predetermined positions of the playfield, arranged is an ordinary pattern start gate 14.

The image display 8, the start trap 16 and the variable prizewinning player 10, that are provided on the game board, are arranged in the vertical center of the game board with their respective centers aligned with the centerline of the game board. Namely, the image display 8, the start trap 16 and the variable prizewinning player 10 are arranged in a manner aligned at their centers so that the centers of those structures are coincident with the center of the game board. The image display 8 has light sources 801a and 801b provided symmetric about a plane orthogonal to the display surface of the image display 8 (game board surface having the playfield) and including the centerline of the image display 8 (plane A whose position is shown by the dotted line in FIG. 2). The light emitted from the light source 801a and the light emitted from the light source 801b are emitted in symmetric directions about the plane orthogonal to the display surface of the image display 8 and including the centerline of the image display 8. Accordingly, the player, if playing a game in a position facing the game machine, is allowed to view the image stereoscopically with balance in any of left and right directions.

In the game machine of this embodiment, a game is to be played by hitting balls (pachinko balls) toward the playfield from a ball shooter (not shown). The ball thus hit is to fall through the playfield while turning a rolling direction due to roll-inducing members 12, such as pinwheels, arranged at various points in the playfield, and successfully enter the start trap 16, the ordinary prizewinning prize trap 15 or the special variable prizewinning player 10. Otherwise, they are discharged through an outlet provided the lowest in the playfield. Successful entry of a ball to the ordinary prize trap 15 is detected by prizewinning player sensors 51.1-51.N (see FIG. 2) provided on each ordinary prize trap.

In case the ball successfully enters the start trap 16, the ordinary prize trap 15 or the special variable prizewinning player (high prize trap) 10, a payback unit (discharger) gives out balls as a prize in the number commensurate with the successfully-entered prize trap, which are to be supplied in a dish 21:

When there is a successful entry of a ball to the start trap 16, the image display 8 starts a variable display game variably displaying sequentially identification information structured with the foregoing numerals, or the like, to display an image concerned with the variable display game. When successful entry to the start trap 16 occurs in a predetermined timing (specifically, when the special-pattern random-number counter value in detecting successful entry is of a winning value), a big win comes in status and the same stopping character comes in all of the three slots. At this time, in the special variable prizewinning player 10, a high-prize solenoid 10A (see FIG. 2) is energized to change, for a predetermined time (e.g. 30 seconds), the high-prize trap from a close state not to accept the ball (state unfavorable against the player) into an open state ready to accept the ball (state favorable for the player). Namely, because the high-prize trap opens great only for the predetermined time, the player in this duration can gain a game worth to get much more balls.

Figure 2:
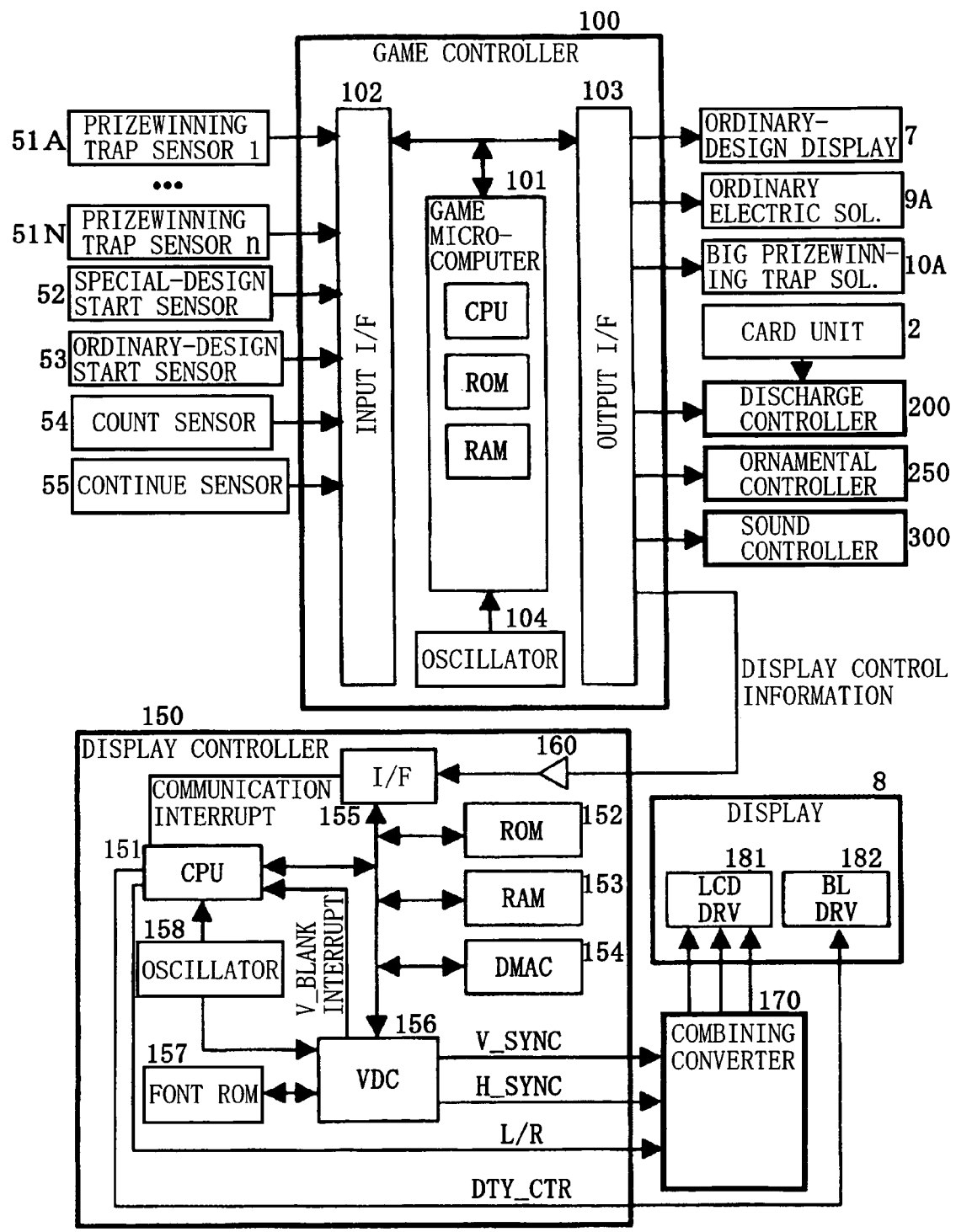
FIG. 2 is a block diagram of a control system of the game machine in the embodiment of the invention.

Successful entry of a ball to the start trap 16 is to be detected by the special-pattern start sensor 52 (see FIG. 2). The special-pattern random-number counter value extracted by the passage timing of the ball is stored as a special-pattern prize memorization in a predetermined storage domain (special-pattern prize storage domain) in the game controller 100, within the limit of a predetermined number of times (e.g. in an amount of maximally successive four times). The number of special-pattern prize memorizations is to be displayed in a special-pattern storage status display area provided in a part of the display screen of the image display 8. The game controller 100 is to make a variable display game on the image display 8, depending upon the special-pattern prize memorization.

Successful entry of a ball to the special-variable prizewinning player 10 is detected by a count sensor 54 and continue sensor 55 (see FIG. 2).

In case there is a passage of ball to the ordinary-pattern start gate 14, an ordinary-pattern display 7 starts a variable display of an ordinary-pattern (e.g. design constituted by one-digit figures). When detecting a passage to the ordinary-pattern start gate 14 in predetermined timing (specifically, when the ordinary-pattern random-number counter value upon passage detection is of a winning value), an ordinary-pattern-concerned win status comes so that the ordinary-pattern stops into a win pattern (win number). At this time, in the ordinary variable prizewinning player 9 provided in front of the start trap 16, an ordinary electric-driven scoring-element solenoid 9A (see FIG. 2) is energized to widen the aperture of the start trap 16 for a predetermined time (e.g. 0.5 second). This enhances the probability for a ball to successfully enter the start trap 16.

The passage of a ball to the ordinary-pattern start gate 14 is to be detected by an ordinary-pattern start sensor 53 (see FIG. 2). The ordinary-pattern random-number counter value, extracted due to passage timing of the ball, is stored as an ordinary-pattern prize memorization in a predetermined storage domain (ordinary-pattern prize storage domain) in the game controller 100, within the limit of a predetermined number of times (e.g. in an amount of maximally successive four times). The number of ordinary-pattern prize memorizations is to be displayed on an ordinary-pattern storage status display 19 made up by a predetermined number of LEDs provided on the right of the variable prizewinning player 10. The game controller 100 draws lots of wins as to the ordinary-pattern depending upon the ordinary-pattern prize memorization.

In required points of the game machine, there are provided ornamental light-emitting devices, such as ornamental lamps and LEDs. Namely, ornamental lamps, for emitting light in accordance with the progress of game, are provided in the center case 11 and in the attacker (periphery of the variable prizewinning player 10) provided in the center and the lower regions of the game board, respectively. Furthermore, side-case lamps are provided in the upper left and right of the game board while side lamps 33 are provided in the left and right sides of the game board. Meanwhile, game-frame ornamental lamps are provided in the game frame. These lamps are turned on in accordance with the progress of a game, allowing the player to have the continuing interest on the game. Meanwhile, in the front frame 3 above the cover glass 18, a first alert lamp 31 and second alert lamp 32 is provided to give an alert, e.g. abnormal discharge of balls, by lighting.

An upper dish 21, for supplying balls to the ball shooter, is provided in an open-close panel 20 in the lower part of the front frame 3. The fixed panel 22 is arranged with a lower dish 23, a manipulator 24 of the ball shooter, etc. A sound output device (speaker) is provided.

The operation panel 26 for the card-based ball lease unit 2 is formed in the outer surface of the upper dish 21 of the game machine 1. This is provided with a prepaid card-balance display (not shown), a ball-lease switch 28 for instructing for leasing balls, and a card-return switch 30 for instructing to return a card, and so on.

The card-based ball lease unit 2 incorporates therein a card reader/writer to read data from and write data to the card (prepaid card, etc.) inserted in the card insert 25 in the front surface, and a ball-lease controller.

FIG. 2 is a block diagram showing a part of the control system centered on the game controller 100 of the game machine in the embodiment of the invention.

The game controller 100, a main control for totally controlling a game, is configured with a game microcomputer 101 incorporating a CPU administering game control, a ROM storing invariable information for game control and a RAM to be used as a work area in game control, an input interface 102, an output interface 103, an oscillator 104, and so on.

The game microcomputer 101 is to receive detection signals from various detectors (ordinary prize trap sensors 51.1-51.N, a special-pattern start sensor 52, an ordinary-pattern start sensor 53, a count sensor 54, a continue sensor 55) through the input interface 112, and perform various processing, such as drawing a big win. Through the output interface 113, instruction signals are to be sent to various controls (a staging controller 150, a discharge controller 200, an ornamental controller 250, a sound controller 300), the ordinary-pattern display 7, the ordinary electric-driven scoring elements solenoid 9A, and the big-win trap solenoid 10A, and so on, thereby the game can be controlled totally.

The discharge controller 200 is to control the payback unit to operate and discharge prize balls, depending upon a prize-ball command signal from the game controller 100. Meanwhile, it controls to operate the payback unit and discharge lease balls, depending upon a ball lease request from the card-based ball lease unit 2.

The ornamental controller 250 controls ornamental light emitting devices (ornamental lamp in the center case 11, ornamental lamp in the attacker, side lamps 33, side-case lamp, game ornamental lamp, alert lamp 31, etc.) such as ornamental lamps and LEDs, depending upon a command signal from the game controller 100. Meanwhile, it functions as a lamp controller by controlling the display on the ordinary-pattern prize storage display 19.

The sound control 300 is to control the sound effect to be output from the speaker, thus functioning as a sound control.

Incidentally, the communication of from the game controller 100 to the various slave controllers (the staging controller 150, the discharge controller 200, the ornamental controller 250, and the sound controller 300) is permitted only in a single direction of from the game controller 100 to the slave controllers. This can prevent an illicit signal from being inputted to the game controller 100 from the slave controller end.

The power supply (not shown) of the game machine has a backup circuit and a power-failure monitor circuit besides a power supply circuit. The power-failure monitor circuit, when detecting a predetermined voltage drop on the power supply, outputs a power-failure detection signal and subsequently a reset signal to the game controller 100, etc. The game controller 100 performs a predetermined power-failure process when a power-failure detection signal has been received, and shuts down the operation of the CPU when received a reset signal. The backup power supply is to supply a backup power to the RAM of the game controller 100, etc. and backs up game data (game information, game controlling information: including variable display game information).

The staging controller 150, for performing display-control of an image, is to function as staging control means together with the game controller 100 and combination converter 170. The staging controller 150 is constituted with a CPU 151, a VDC (Video Display Controller) 156, a RAM 153, an interface 155, a ROM 152 storing a program, etc., a font ROM 157 storing image data (pattern data, background image data, a moving-image character data, texture data, and so on), an oscillator 158 for generating a clock signal that is to generate a synchronization signal and a strobe signal), and so on.

The CPU 151 executes a program stored in the ROM 152, and operates image control information (pattern display information, background image information, moving-image object screen information, etc. that are constituted by sprite data and polygon data) for a predetermined variable display game depending upon a signal from the game controller 100, thus instructing the VDC 156 to generate alternately a right-eye image signal and a left-eye image signal. An L/R signal is generated in timing with a generation of the right-eye and left-eye image signals, thus enabling to distinguish which the generated image signal is a right-eye image signal or a left-eye image signal.

The VDC 156 makes a polygon rendering (or usual bit-map rendering), for example, of an image depending upon the image data stored in the font ROM 157 and the content the CPU 151 operated image control information, and puts a predetermined texture to each polygon and stores it in the RAM 153, a frame buffer. The VDC 156 sends an image of the RAM 153 in predetermined timing (vertical synchronization signal V_SYNC, horizontal synchronization signal H_SYNC) toward the LCD (combination converter 170).

In the rendering process to be made by the VDC 156, dot rendering, line rendering, triangle rendering and polygon rendering are carried out to further perform thereon texture mapping, alpha blending, shading (grow shading, etc.) and shade-surface erasure, followed by outputting the image signal to the combination converter 170 through a γ-correction circuit 159.

Incidentally, the VDC 156 may once store the rendered image data in the RAM 153 as a frame buffer, and thereafter output it to the combination converter 170 in timing with the synchronization signal (V_SYNC, etc.).

Here, the frame buffer may be set with a plurality of frame buffers respectively in predetermined storage domains of the RAM 153. The VDC 156 can make an overlay output with a desired image.

The VDC 156 is connected with an oscillator 158 for supplying a clock signal. The clock signal generated by the oscillator 158 defines the operation period of the VDC 156, to generate a signal to be output from the VDC 156, e.g. vertical synchronization signal (V_SYNC) and horizontal synchronization signal (H_SYNC), and output it to the combination converter 170 and image display 8.

Meanwhile, the CPU 151 of the staging controller 150 outputs an L/R signal based on the clock signal of the oscillator 158 for distinguishing which the image data to be output to the combination converter 170 is of a left-eye image or a right-eye image.

Furthermore, the CPU 151 generates a duty control signal DTY_CTR based on the clock signal of the oscillator 158 and outputs it to the image display 8, in order to control the brightness on the light-emitting elements 810a, 810b (see FIG. 3) as a backlight of the image display 8.

The combination converter 170 decides whether the image signal sent from the VDC 156 is a right-eye image signal or a left-eye image signal, depending upon the L/R signal output from CPU 151. Meanwhile, the combination converter 170 is provided with a right-eye frame buffer, a left-eye frame buffer and stereoscopic-view frame buffer so that it can write a decided right-eye image signal in the right-eye frame buffer and a decided left-eye image signal in the left-eye frame buffer. By combining a right-eye image and a left-eye image together, a stereoscopic-view image is generated. The stereoscopic-view image signal is written to the stereoscopic-view frame buffer, to output the stereoscopic image data as an RGB signal to the image display 8.

As noted before, by means of the stereoscopic-view image signal that the right-eye image and a left-eye image are combined together, a stereoscopic-view image is displayed such that the right-eye image and the left-eye image are alternately displayed on every vertical line (scanning line) in display unit of the liquid-crystal display.

Specifically, generation is within a parallax between the right-eye image and the left-eye image depending upon the depth information of the stereoscopic-view image information (display object). In the case of polygon rendering, a right-eye image and a left-eye image are generated by rendering from a view point of left eye and a view point of right eye, respectively. In the case of using sprite data, rendering is with a deviation in the left-right direction in an amount of the parallax.

In this manner, left-eye images and right-eye images are generated alternately. The left-eye images are stored in the left-eye frame buffer while the right-eye images are stored in the right-eye frame buffer. Namely, the left-eye image data, sent from the VDC 156 during outputting an L signal, is written in the left-eye frame buffer while the right-eye image data, sent from the VDC 156 during outputting an R signal, is written in the right-eye frame buffer. Then, the left-eye image data written in the left-eye frame buffer and the right-eye image data written in the right-eye frame buffer are read out and written to the stereoscopic-view frame buffer.

By functioning of the CPU 151, VDP 156 and combination converter 170 as explained above, left-eye and right-eye images are generated to cause a binocular parallax depending upon a display position thereof. Display position control means is constituted by making a display control such that the image is recognized as a three-dimensional stereoscopic image.

In the image display 8, there are provided a liquid-crystal driver (LCD, DRV) 181 and a backlight driver (BL DRV) 182.

The liquid-crystal driver 181 applies voltages sequentially to the electrodes of the liquid-crystal display panel 804 depending upon a V_SYNC signal, H_SYNC signal and RGB signal sent from the combination converter 170, and displays a stereoscopic-view combined image on the image display 8.

A backlight driver 182 changes the duty ratio of a voltage to be applied to the backlight (light-emitting elements 810a, 810b in FIG. 3) depending upon a DTY_CTR signal output from the VDC 156, and changes the brightness on the image display 8.

Namely, the game controller 100, when the ball shot into the playfield successfully enters the start trap 16, extracts and stores a predetermined random number (special-pattern random number, big win random number). Then, the game controller 100 edits a display-control command signal for instructing the staging controller 150 to make a variable display and sends the display-control command signal thus edited. The CPU 151 of the staging controller 150, when receiving the display-control command signal, reads the display image data corresponding to the display-control command signal out of the font ROM 157 (storage means) and generates display data to be displayed on the image display 8 cooperatively with the VDC 156 and combination converter 170. By thus functioning the game controller 100, lottery means and game control means are constituted. Meanwhile, by functioning the staging controller 150 and combination converter 170, operation means is constituted.

In a position in front of an interface 155 for receiving a staging control command signal from the game controller 100, there is provided a buffer circuit 160 as signal-conveyance-direction regulating means. This allows to input a signal only of from the game controller 100 to the staging controller 150 but prohibits to output a signal from the staging controller 150 to the game controller 100. Incidentally, where implementing bi-directional communications between the game controller 100 and the staging controller 150, a two-way buffer circuit can be used in the buffer circuit 160.

In the embodiment explained above, separately provided are the ornamental controller 250 and sound controller 300 and the staging control 150. However, of among the slave controllers, the ornamental controller 250 and sound controller 300 may be included in the staging controller 150, whereby the ornamental controller 250 and sound controller 300 may be integrally configured with the staging controller 150.

Figure 3:
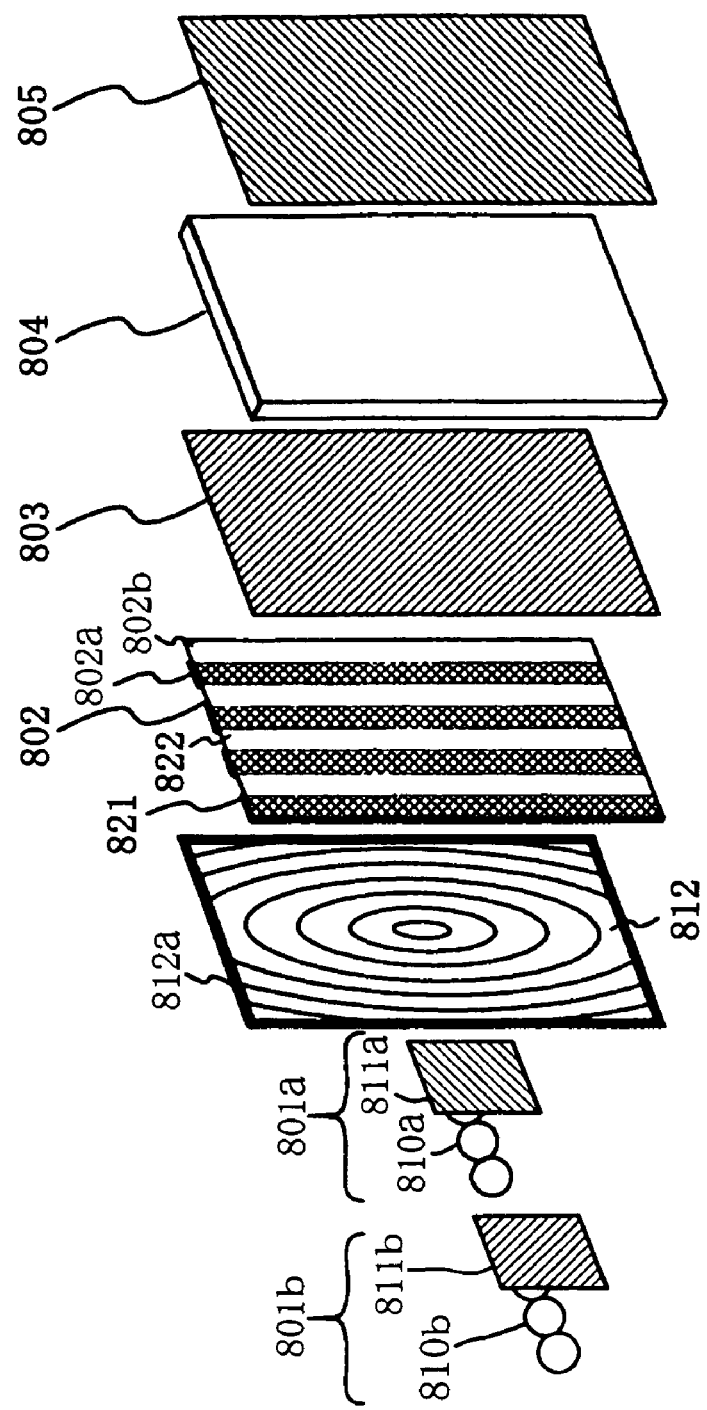
FIG. 3 is a structural view of an image display in a first embodiment of the invention.

FIG. 3 is an explanatory view showing a structure of the image display in the first embodiment of the invention.

A light source 801a is structured with a light-emitting element 810a and a polarizing filter 811a while a light source 801b is structured with a light-emitting element 810b and a polarizing filter 811b. The light source 801a and the light source 801b are provided in positions symmetric about nearly the center of the liquid-crystal display panel 804. The light-emitting elements 810a, 810b are each structured by arranging, side by side, light emitting elements for red, green and blue (three primary colors of light). The polarizing filter 811a and the polarizing filter 811b are set with polarization characteristics different in polarization of transmitting light from each other (e.g. polarization of transmitting light is different by 90 degrees between the polarizing filter 811a and the polarizing filter 811b). A Fresnel lens 812 has a lens surface having concentric microstructures on one surface thereof. As referred later, the light transmitted the polarizing filter 811a is to reach the left eye of the observer while the light transmitted the polarizing filter 811b is to reach the right eye of the observer.

The light, different in polarization emitted by the light sources 801a and 801b, is projected to the Fresnel lens 812. The Fresnel lens 812 is a convex lens. At the Fresnel lens 812, the light emitted spreading from the light-emitting element 810 is refracted in its light path nearly into parallel and then transmitted through a fine-phase-difference plate 802, followed by being projected onto a liquid-crystal panel display 804. Meanwhile, the Fresnel lens 812 is provided, at a periphery thereof, with a frame 812a not to transmit light (e.g. black).

At this time, the light from the fine-phase-difference plate 802 exits not to spread left and right, to be projected to the liquid-crystal display panel 804. Namely, the light, transmitted a certain area of the fine phase-difference plate 802, is to transmit a particular portion of display unit of the liquid-crystal display panel 804.

Meanwhile, of the light, which is to be projected onto the liquid-crystal display panel 804, the light passing the polarizing filter 811a and the light passing the polarizing filter 811b enter, at different angles, to the Fresnel lens 812. Those are refracted in the Fresnel lens 812, to be radiated from the liquid-crystal display panel 804 into different paths, left and right.

The liquid-crystal display panel 804 is arranged with a liquid crystal twisting a predetermined angle (e.g. 90 degrees) between two transparent plates (e.g. glass plates), thus structuring a TFT liquid-crystal display panel. The light entered the liquid-crystal panel, in a state of no application voltage to the liquid crystal, is to exit with a 90-degree deviation relative to the polarization of the incident light. Meanwhile, in the state of voltage application to the liquid crystal, the liquid crystal is released from twist, thus allowing the incident light to exit with its polarization maintained as it is. Incidentally, in the liquid-crystal display panel 804 of this embodiment, because emission-light color is changed by the light sources 801a, 801b, there is no need to provide a color filter correspondingly to the display elements of the liquid-crystal display panel 804.

There are provided a fine-phase-difference plate 802 and a polarizing plate 803 (first polarizing plate) on one side of the liquid-crystal display panel 804 closer to the light source

801 while a polarizing plate 805 (second polarizing plate) is arranged on the other side closer to the observer.

The fine-phase-difference plate 802 is arranged with areas, for changing the phase of transmitting light, repeated at a fine interval. Specifically, on a light-transmissive substrate 822, there are alternately provided areas 802*a* having a half-wave plate 821 fine in width and areas 802*b* not having a half-wave plate 821, repeatedly at the same fine interval. Namely, there are provided areas 802*a* for changing the phase of transmitting light by the provision of a half-wave plate 821 and areas 802*b* for not changing the phase of transmitting light due to no provision of a half-wave plate 821, repeatedly at a fine interval. The half-wave plate 821 serves as a phase-difference plate for changing the phase of transmitting light.

The half-wave plate 821 has an optical axis inclined 45 degrees relative to the polarization axis of transmitting light, allowing the light transmitted the polarizing filter 811*a* to rotate the polarization axis by 90 degrees to exit. Namely, the light transmitted the polarizing filter 811*a* is rotated at its polarization axis by 90 degrees and made equal to the polarization of the light transmitted the polarizing filter 811*b*. Namely, the area 802*b* not provided with a half-wave plate 821 allows to transmit the light passed the polarizing filter 811*b* and having the same polarization as the polarizing plate 803 while the area 802*a* provided with a half-wave plate 821 allows to exit the light passed the polarizing filter 811*a* and orthogonal in polarization axis to the polarizing plate 803 with a rotation such that it is equal in polarization axis to the polarizing plate.

The repetition of polarization characteristic on the fine-phase-difference plate 802 is provided at nearly the same pitch as the display unit of the liquid-crystal display panel 804 so that the transmitting light is different in polarization on a display-unit basis (i.e. line by line in a vertical direction of display unit). Accordingly, this makes different the polarization characteristic of fine-phase-difference plate 802 correspondingly, on a vertical-line (scanning line) basis, to the display unit of the liquid-crystal display panel 804, thus making different light exit directions on a vertical-line basis.

Otherwise, the repetition of polarization characteristic on the fine-phase-difference plate 802 is provided at a pitch integer times the pitch of display unit of the liquid-crystal display panel 804, to change the polarization characteristic of the fine-phase-difference plate 802 on the basis of every set of plural display units (i.e. on a vertical line basis of every set of plural display units), thereby making a setting such that transmitting light is different in polarization on the basis of every set of plural display units. Accordingly, the polarization characteristic of the fine-phase-difference plate 802 is made different on the basis of every set of plural vertical lines (scanning lines) of the display unit of the liquid-crystal display panel 804, making the light exiting directions different on the basis of every set of plural vertical lines.

In this manner, because of the need to project the light different every repetition in polarization characteristic of the fine-phase-difference plate 802 to the display element (vertical line) of the liquid-crystal display panel 804, the light transmitted the fine-phase-difference plate 802 and projected to the liquid-crystal display panel 804 must be suppressed from spreading left and right.

Namely, the area 802*a* on the fine-phase-difference plate 802, for changing the phase of light, allows the light transmitted the polarizing filter 811*a* to transmit with a polarization made equal to the polarization of light transmitted the polarizing filter 811*b*. Meanwhile, the area 802*b* of the fine-phase-difference plate 802, to not change the phase of light, allows the light transmitted the polarizing filter 811*b* to transmit as it is. The light exiting the fine-phase-difference plate 802 is provided with the same polarization as the light transmitted the polarizing filter 811*b*, to enter the polarizing plate 803 provided on the side of the liquid-crystal display panel 804 closer to the light source.

The polarizing plate 803 has a polarization characteristic to transmit the same polarized light as the light transmitted the fine-phase-difference plate 802. Namely, the light transmitted the polarizing filter 811*b* transmits the polarizing plate 803 while the light transmitted the polarizing filter 811*a* rotates its polarization axis by 90 degrees and is transmitted through the polarizing plate 803. Meanwhile, the polarizing plate 805 has a polarization characteristic to transmit the polarized light whose polarization axis is different by 90 degree from that of the polarizer 803.

The fine-phase-difference plate 802 and the polarizing plate 803, explained above, are structured by being bonded together. This is to function as a vertical-stripe-patterned filter provided with the first area to transmit the light having particular polarization as it is, and the second area to transmit the light, having the polarization axis orthogonal to that of the light having the particular polarization, rotated its polarization axis by 90 degrees, side by side in a repeated fashion.

The fine-phase-difference plate 802, polarizing plate 803 and polarizing plate 805 thus structured are bonded with the liquid-crystal display panel 804, to structure an image display 8 by a combination of the fine-phase-difference plate 802, the polarizing plate 803, the liquid-crystal display panel 804 and the polarizing plate 805. At this time, because the liquid-crystal molecules of the liquid-crystal display panel 804 are aligned in a state where voltage is applied to the liquid crystal, the light transmitted the fine-phase-difference plate 802 is to transmit the polarizing plate 805. Meanwhile, in the state where no voltage is applied to the liquid crystal, because the liquid-crystal molecules of the liquid-crystal display panel 804 are oriented twisted 90 degrees, the light transmitted the fine-phase-difference plate fine-phase-difference plate is allowed to exit the liquid-crystal display panel 804 with its polarization twisted 90 degrees so that it does not transmit the polarizing plate 805.

Incidentally, in front of the polarizing plate 805 (on a side closer to the observer), a diffuser may be provided which is to vertically diffuse the light transmitted the liquid-crystal panel. The diffuser is structured by a lenticular lens, which is structured by arranging laterally-extending semi-cylindrical lenses repeated lengthwise on a surface, having the other surface made flat. This is attached on the front surface of the polarizing plate 805 such that the microstructured surface faces the observer while the flat surface faces the liquid-crystal display panel 804. Accordingly, the light, transmitted the liquid-crystal display panel 804 and entered into the diffuser, is refracted by the microstructures into vertical diffusion at its light path, thus radiated toward the observer.

Figure 4:
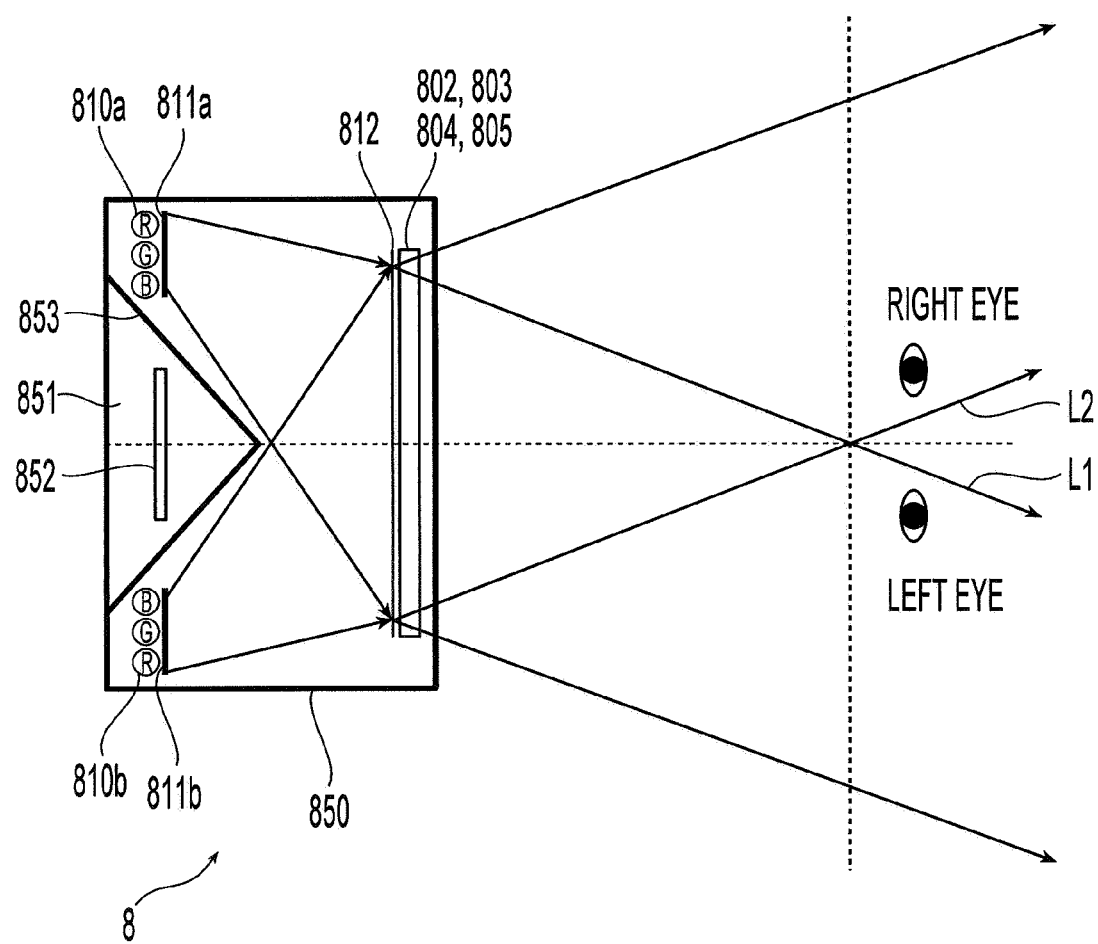
FIG. 4 is a plan view of an optical system of the image display in a first embodiment of the invention.

FIG. 4 is a plan view showing an optical system of the image display in the first embodiment of the invention.

The light sources 801*a* (light-emitting element 810*a*, polarizing filter 811*a*), 801*b* (light-emitting element 810*b*, polarizing filter 811*b*) are provided at left and right back corners at a housing 850, in a manner that both light sources are spaced in distance. Between the light sources within the housing 850, there is arranged a substrate 852 structured with a display control circuit for controlling the display on the image display, in a space 851 in a position not overlap with a path of the light emitted from the light source. The space where the circuit board is arranged is partitioned from the space serving for a light path within the housing, by a wall 853 provided in a position not overlapped with a path of the light emitted from the light source.

The light emitted from the light source 801a, 801b spreads radial and reaches the liquid-crystal display panel 804. Namely, the light, emitted from the light-emitting element 810a of the first light source 801a and transmitted the polarizing filter 811a (light path center being shown by the one-dot chain line), reaches the Fresnel lens 812 where it is changed in light traveling direction by the Fresnel lens 812, to transmit the fine-phase-difference plate 802, polarizing plate 803, liquid-crystal display panel 804 and polarizing plate 805 nearly vertically (from somewhat right to left) thus reaching the left eye.

The light-emitting elements 810a, 810b are each structured by arranging red, green and blue (three primary colors of light) light-emitting elements side by side. The light-emitting elements are arranged in the order of blue, green and red from the inward. Namely, the light-emitting elements are arranged such that three primary colors of light radiated from the periphery of the Fresnel lens toward the center are to pass a common point (L1, L2). Because blue light is greater in refractive angle on the Fresnel lens 812, the blue light entered the Fresnel lens 812 from the inward and the red light entered the Fresnel lens 812 from the outward are to exit, at nearly the same angle, a peripheral portion of the Fresnel lens 812. Namely, in the position suited for stereoscopic view in the neighborhood of the centerline of the image display 8, the three primary colors of light emitted from the left and right light sources 810a, 710b transmit the Fresnel lens 812 and exit there in the same direction thus reaching the left and right eyes. Incidentally, as to the light spread toward the periphery of the image display 8, three primary colors of light exit in different directions thus causing chromatic aberration.

Meanwhile, the light, emitted from the light-emitting element 810b of the second light source 810b and transmitted the polarizing filter 811b (light path center being shown by the broken line), reaches the Fresnel lens 812 where the light is changed in traveling direction by the Fresnel lens 812, to transmit the fine-phase-difference plate 802, polarizing plate 803, liquid-crystal display panel 804 and polarizing plate 805 nearly vertically (from somewhat left to right) thus reaching the right eye.

In this manner, the light, emitted from the light sources 801a, 801b and different in polarization, is projected nearly vertically to the liquid-crystal display panel 804 by means of the Fresnel lens 812 as optical means. Namely, the light-emitting element 810a and polarizing filter 811a and the light-emitting element 810b and polarizing filter 811b constitute light sources to project the light different in polarization plane to the liquid-crystal display panel 804 through different paths. The light transmitted the liquid-crystal panel display 804 is caused to exit therefrom by different paths and reach the right eye or the left eye. Namely, by providing equal the scanning line pitch over the liquid-crystal display panel 804 and the repetition pitch of polarization characteristic on the fine-phase-difference plate 802, projected is the light coming from different directions on a scanning-line-pitch basis of the liquid crystal display panel 804, thus exiting the light in different directions.

Figure 5A:
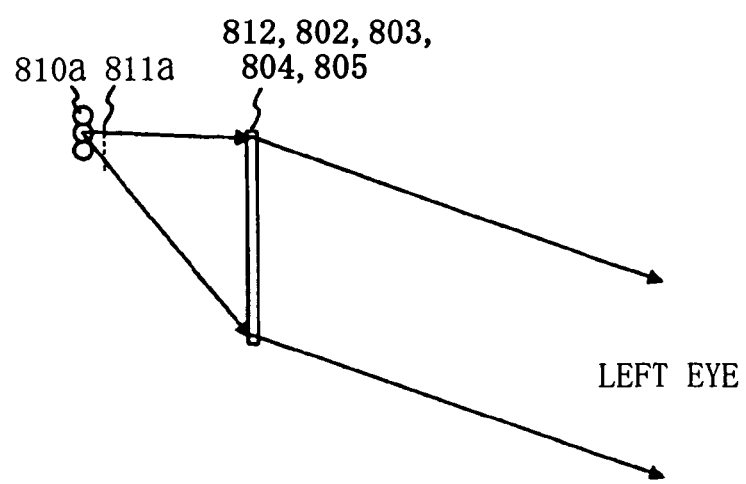
FIGS. 5(a) and 5(b) are explanatory views of a path of the light radiated from the image display in a first embodiment of the invention.
Figure 5B:
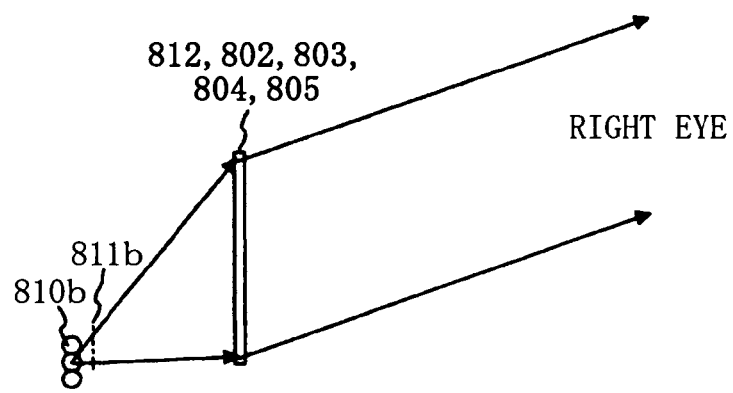

FIGS. 5(a) and 5(b) are figures explaining a path of the light radiated from the image display in the first embodiment of the invention. FIG. 5(a) shows a path of light transmitting a right-side area 11a of the polarizing filter and reaching the left eye while FIG. 5(b) shows a path of light transmitting a left-side area 11b of the polarizing filter and reaching the right eye.

As shown in FIG. 5(a), the light emitted from the light source 801a (light-emitting element 810a, polarizing plate 811a) transmits the Fresnel lens 812 and reaches the fine-phase-difference plate 802 where it transmits an area 802a of fine-phase-difference plate 802 to rotate its polarization axis by 90 degrees to exit (transmitting the light transmitted the polarizing filter 811a). It further transmits the polarizing plate 803, the liquid-crystal display panel 804 and the polarizing plate 805, thus reaching the left eye. Namely, reaching the left eye is a left-eye image displayed by the display element in a position corresponding to the area 802a of the liquid-crystal display panel 804.

The area 802b, arranged alternately with the area 802a of the fine-phase-difference plate 802, is not to change the polarization of light. Accordingly, the light from the polarizing filter 811a does not transmit the polarizing plate 803, and the right-eye image displayed on the display element in a position corresponding to the area 802b of the liquid-crystal display panel 804 does not reach the left eye.

Meanwhile, as shown in FIG. 5(b), the light emitted from the light source 801b (light-emitting element 810b, polarizing plate 811b) transmits the Fresnel lens 812 and reaches the fine-phase-difference plate 802 where it transmits an area 802b of fine-phase-difference plate 802 for transmitting the same polarization of light as the polarizing filter 811b. It transmits the liquid-crystal display panel 804 and the polarizing plate 805, thus reaching the right eye. Namely, reaching the right eye is a right-eye image displayed by the display element in a position corresponding to the area 802b of the liquid-crystal display panel 804.

The area 802a, arranged alternately with the area 802b of the fine-phase-difference plate 802, is to change the polarization of light. Accordingly, the light from the polarizing filter 811b does not transmit the polarizing plate 803, and the left-eye image displayed on the display element in a position corresponding to the area 802a of the liquid-crystal display panel 804 does not reach the right eye.

Figures 6, 7:
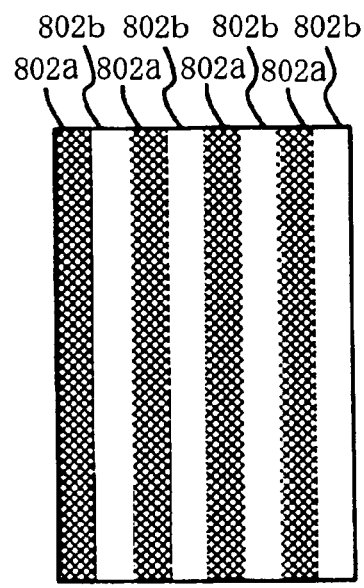
FIG. 6 is a front view of a fine phase difference plate of the image display in the embodiment of the invention.
FIG. 7 is a chart explaining parameters for use in an image output control process in the embodiment of the invention.

FIG. 6 is a front view showing the fine-phase-difference plate 802 of the image display in the embodiment of the invention.

The fine-phase-difference plate 802 is provided with a half-wave plate 821 on a substrate 822 transmissive to light. The area, for changing the polarization of transmitting light, is successively arranged repeatedly at a predetermined fine interval. The polarization of light, incident on the areas successively repeatedly arranged, is different between the polarizing filters 811a and 811b. In the area for changing the polarization of transmitting light, the incident light is allowed to rotate its polarization axis by 90 degrees to exit. The repetition of polarization characteristic on the fine-phase-difference plate 802 is nearly at the same pitch as the display units on the liquid-crystal display panel 804.

Namely, the polarization axis can be equal between the light transmitted the polarizing filter 811a and rotating its polarization axis by 90 degrees by the fine-phase-difference plate and the light transmitted the polarizing filter 811b and then the fine-phase-difference plate as it is. Those of light transmit the polarizing plate 805. Because the fine-phase-difference plate 802 is successively arranged with areas to change the polarization of transmitting light and areas not to change the polarization of transmitting light repeatedly every vertical line of display unit on the liquid-crystal display panel 4, the light transmitted the fine-phase-difference plate 802 and the polarizing plate 803 turns into the same polarization of light traveling in different directions on a vertical-line basis.

Incidentally, as mentioned before, the repetition of polarization characteristic on the fine-phase-difference plate 802 may be at a pitch integer-times the pitch of display units on the liquid-crystal display panel 804. By thus changing the polarization characteristic of the fine-phase-difference plate 802 on the basis of every set of plural display units, the polarization of transmitting light may be different on the basis of every set of plural display units.

Now, explained is an image output control process in the embodiment of the invention.

Figure 8:
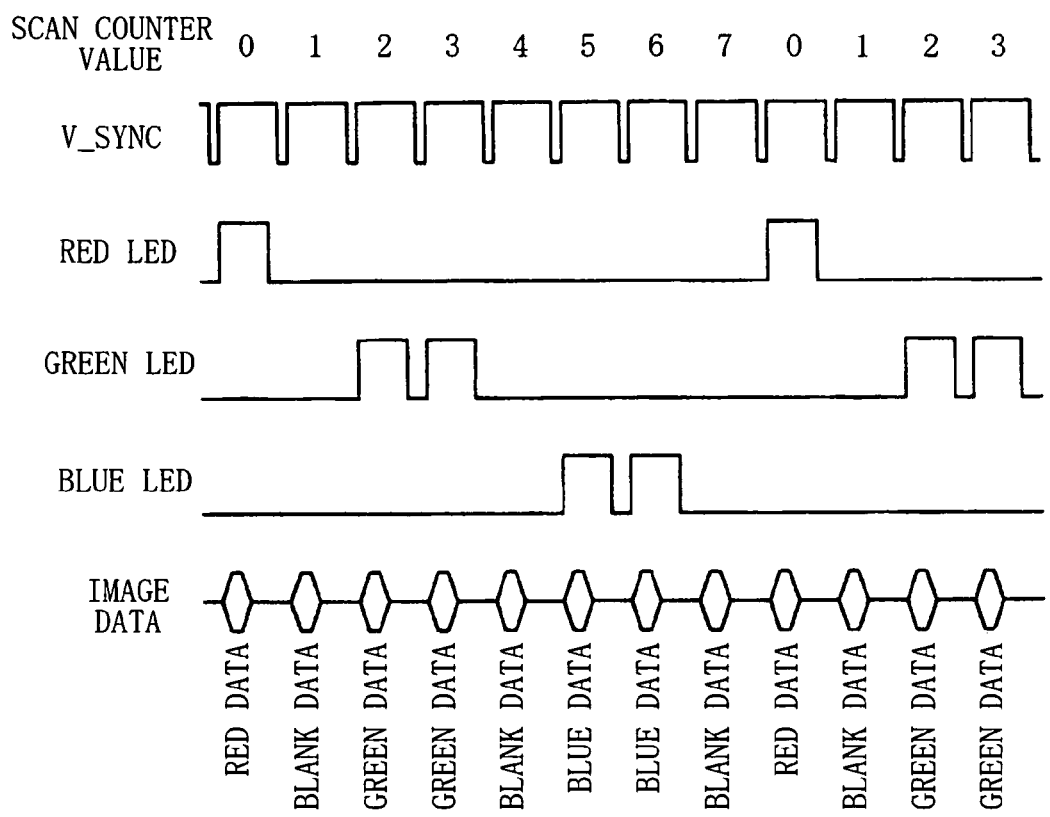
FIG. 8 is a timing chart of the image output control process in the embodiment of the invention.

FIG. 7 is a chart explaining the parameter (scan counter) values for use in the image output control process in an embodiment of the invention and the operation of image display control process. FIG. 8 is a timing chart in the image output control process in the embodiment of the invention.

The scan counter values are prepared with eight values of from "0" to "7". In each timing of V_SYNC, update is made to increase one at a time from "0" to "7". In the timing of V_SYNC next to "7", control is made for return to "0".

When the scan counter value is "0", the red light-emitting element is one of among the light-emitting elements 810a, 810b, to emit red light from the light source 801a, 801b (backlight). In this timing, the red component of image data separated from a display image is output to the image display 8, to display a red component image on the liquid-crystal display panel 804.

When the scan counter value in the next V_SYNC timing is "1", both of the light-emitting elements 810a, 810b are off, no colors of light of red, green and blue are emitted from the light sources 801a, 801b (backlight). In this timing, blank data is output to the image display 8. On the liquid-crystal display panel 804, all the display pixels become an off state (state not to transmit light from the light source), thus turning black the display surface of the image display 8.

When the scan counter value in the next V_SYNC timing is "2" and when the scan counter value in the next V_SYNC timing but one is "3", the green light-emitting element is on of among the light-emitting elements 810a, 810b, to emit green of light from the light sources 801a, 801b (backlight). In this timing, the green component of image data separated from the display image is output to the image display 8, to display a green component of image on the liquid-crystal display panel 804.

When the scan counter value in the next V_SYNC timing is "4", both light-emitting elements 810a, 810b are off, no colors of red, green and blue are emitted from the light sources 801a, 801b (backlight). In this timing, blank data is output onto the image display 8. On the liquid-crystal display panel 804, all the display pixels become an off state (state not to transmit light from the light source), thus turning black the display surface of the image display 8.

When the scan counter value in the next V_SYNC timing is "5" and when the scan counter value in the next V_SYNC timing is "6", the blue light-emitting element is on of among those of the light-emitting elements 810a, 810b, to emit blue portion of light from the light sources 801a, 801b (backlight). In this timing, the blue component of image data separated from the display image is output to the image display 8, to display a blue component of image on the liquid-crystal display panel 804.

When the scan counter value in the next V_SYNC timing is "7", both light-emitting elements 810a, 810b are off, no colors of red, green and blue are emitted from the light sources 801a, 801b (backlight). In this timing, blank data is output onto the image display 8. On the liquid-crystal display panel 804, all the display pixels become an off state (state not to transmit light from the light source), thus turning black the display surface of the image display 8.

According to the image output control process based on the above timing, the red light-emitting element is put on for a time of one cycle, the blue light-emitting element is on for a time of two cycles, and the green light-emitting element is on also for a time of two cycles. Namely, control is in a manner to provide green-image display time and blue-image display time nearly two times longer than red-image display time, thus leveling off the difference in brightness between the red, green and blue LEDs by means of the difference in lighting time. Accordingly, the colors can be made equal in light-intensity integration value, thus enabling display control with efficiency.

Figure 9:
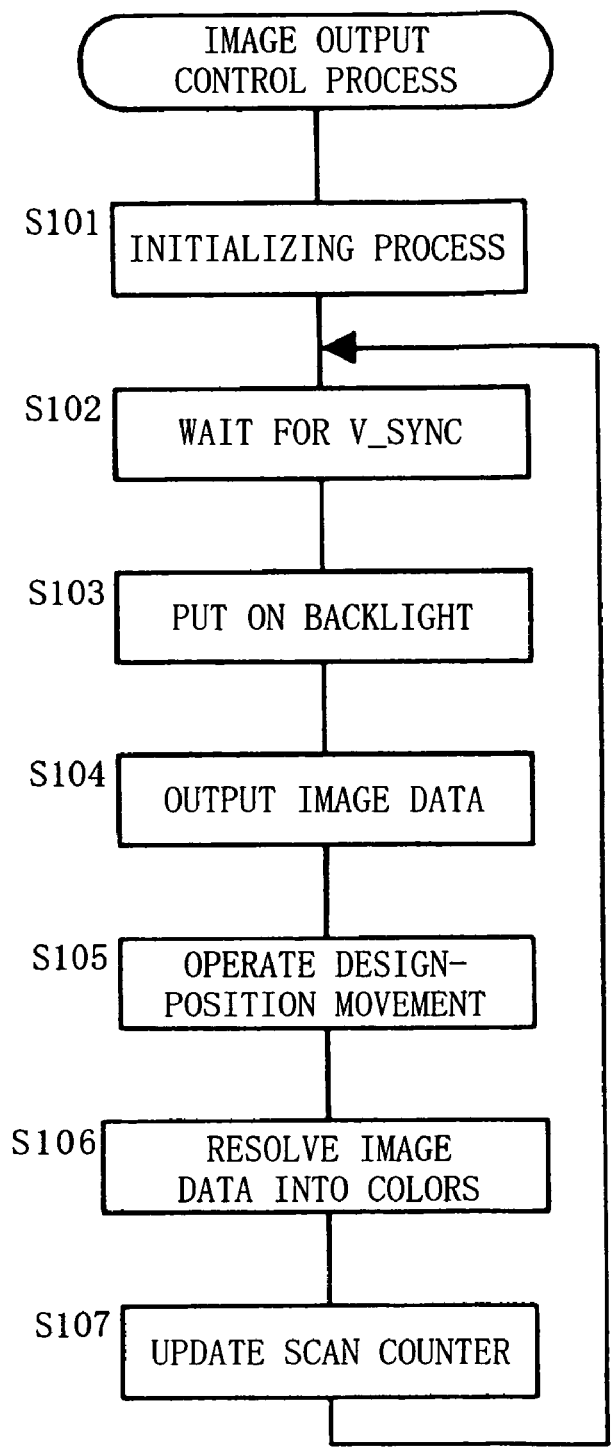
FIG. 9 is a flowchart of the image output control process in the embodiment of the invention.

FIG. 9 is a flowchart of the image output control process in this embodiment of the invention.

First of all, initialization process is performed to initialize the scan count to "0". Furthermore, prepared is a red component of image data corresponding to the red light-emitting element to be first put on (S101). Then, V_SYNC is waited for in timing (S102) to put on the light-emitting element corresponding in color to the scan counter value (S103). Incidentally, when the scan counter value is "1", "4" or "7", the light-emitting element goes off and hence no colors of light in red, green and blue are emitted from the light source. Then, image data corresponding to the scan counter value (i.e. image data corresponding in color to the light-emitting element put on at S103) is output (S104). Incidentally, when the scan counter value is "1", "4" or "7", the light-emitting element goes off so that blank data is displayed on the liquid-crystal display panel 804, thus making black the display screen of the image display 8.

Then, operated is a display position of a design to be displayed variable in the next display timing, to generate image data (S105). The image data is decomposed into light emission colors of the light-emitting elements, to generate a display image in each color (S106).

Then, the scan counter is updated, and the process moves to the step S102 where the next V_SNC is waited for in timing.

Figure 10:
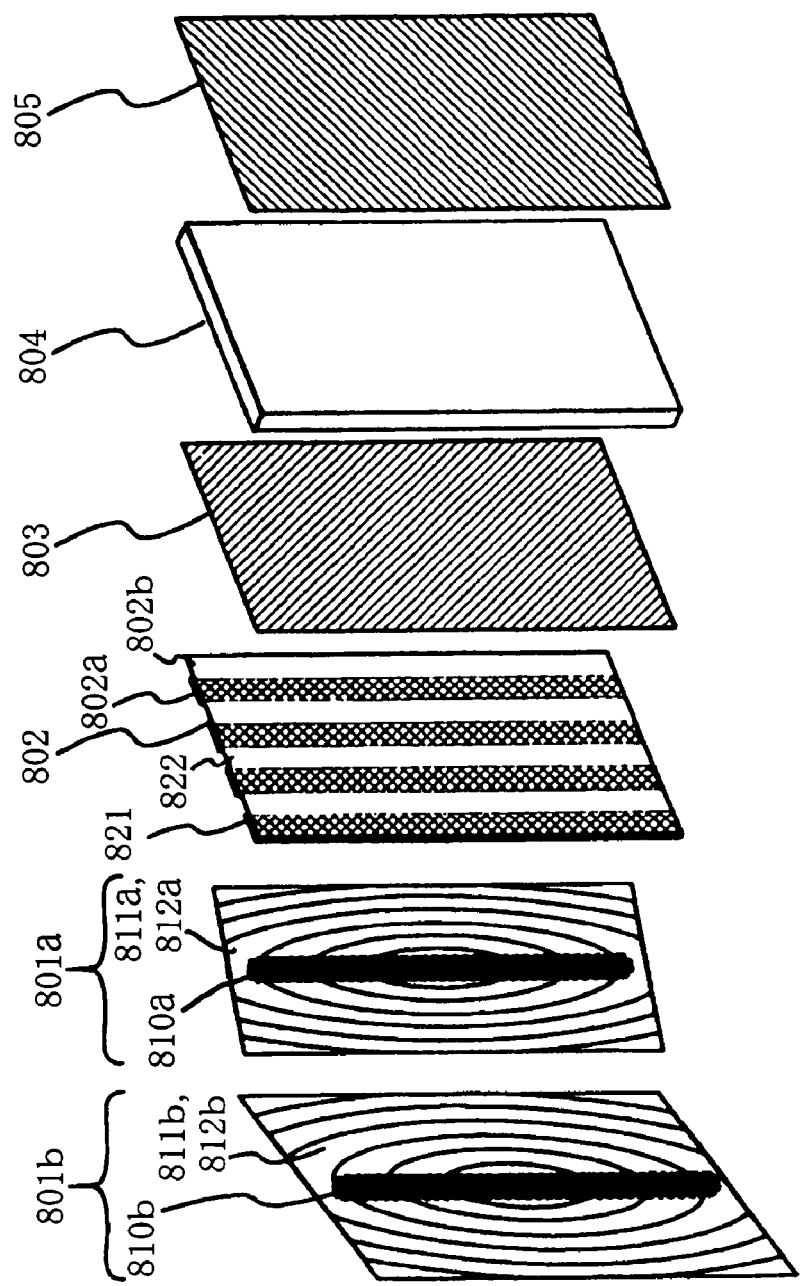
FIG. 10 is a structural view of an image display in a second embodiment of the invention.

FIG. 10 is an explanatory view showing a structure of an image display in a second embodiment of the invention.

A light source 801a is structured with a light-emitting element 810a, a polarizing filter 811a and a Fresnel lens 812a while a light source 801b is structured with a light-emitting element 810b, a polarizing filter 811b and a Fresnel lens 812b. The light source 801a and the light source 801b are provided in positions symmetric about nearly the center of the liquid-crystal display panel 804. The light-emitting element 810a, 810b is structured by vertically arranging a linear light source capable of emitting three primary colors of light. The polarizing filter 811a and the polarizing filter 811b are set up with their polarizing characteristics such that the polarizations of transmitting light are different from each other (e.g. the polarization axes of the polarizing filter 811a and the polarizing filter 811b are differentiated by 90 degrees). The Fresnel lens 812a, 812b has a lens surface having concentric microstructures in one surface thereof, serving as optical means. The polarizing filter 811a and the Fresnel lens 812a are arranged superposed one over another while the polarizing filter 811b and the Fresnel lens 812b are arranged superposed one over another. The polarizing filter 811a and the Fresnel lens 812a are arranged in front of the light source 810a while the polarizing filter 811b and the Fresnel lens 812b are arranged in front of the light source 810b.

The light, emitted from the light-emitting element 810a, is to transmit the polarizing filter 811a at its given polarization of light-only while the light, emitted from the light-emitting element 810b, is to transmit the polarizing filter 811b at its given polarization of light different from the light-emitting element 810a. By the Fresnel lens 812a, 812b serving as a convex lens, the light emitted spreading from the light-emitting element 810a, 810b is refracted in optical path nearly into parallel. Namely, the light-emitting element 810a, the polarizing filter 811a and the Fresnel lens 812a constitute a light source 801a for generating a particular polarization of collimated light. Meanwhile, the light-emitting element 810b, the polarizing filter 811b and the Fresnel lens 812b constitute a light source 801b for generating a particular polarization of collimated light. As referred later, the light transmitted the polarizing filter 811a reaches the left eye of the observer while the light transmitted the polarizing filter 811b reaches the right eye of the observer.

At this time, because the light projected to the fine-phase-difference plate 802 is nearly collimated light, it is projected also to the liquid-crystal display panel 804 without spreading left and right. Namely, the light transmitted a certain area of the fine-phase-difference plate 802 is to transmit a particular display unit area of the liquid-crystal display panel 804.

Meanwhile, of the light projected to the liquid-crystal display panel 804, the light passed the polarizing filter 811a and the light transmitted the polarized filter 811b enter, at different angles, the fine-phase-difference plate 802 and then transmit the liquid-crystal display panel 804, thus exiting from the liquid-crystal display panel 804 into different paths, left and right.

The liquid-crystal display panel 804 is arranged with a liquid crystal twisted a predetermined angle (e.g. 90 degrees) between two transparent plates (e.g. glass plates), e.g. structuring a TFT liquid-crystal display panel. The light entered the liquid-crystal display panel, in a state no voltage is applied to the liquid crystal, is to exit with 90-degree deviated in polarization from the incident light. Meanwhile, in a state a voltage is applied to the liquid crystal, the liquid crystal is released from twist, the incident light is to exit with its polarization unchanged. Incidentally, in the liquid-crystal display panel 804 in this embodiment of the invention, there is no need to provide a color filter correspondingly to the display elements on the liquid-crystal display panel 804 because emission colors are changed by the light sources 801a, 801b. Emission is with the polarization not changed.

A fine-phase-difference plate 802 and a polarizing plate 803 (first polarizing plate) are arranged on a side of the liquid-crystal display panel 804 closer to the light source 801a, 801b while a polarizing plate 805 (second polarizing plate) is arranged on a side closer to the observer.

The fine-phase-difference plate 802 is arranged with areas, for changing the phase of transmitting light, repeated at a fine interval. Specifically, on a light-transmissive substrate 822, there are alternately provided areas 802a having a half-wave plate 821 having a fine width and areas 802b not having a half-wave plate 821, repeatedly at the same fine interval. Namely, there are provided areas 802a for changing the phase of transmitting light by the provided half-wave plate 821 and areas 802b for not changing the phase of transmitting light because of no provision of half-wave plate 821, repeatedly at a fine interval. The half-wave plate 821 serves as a phase-difference plate for changing the phase of transmitting light.

The half-wave plate 821 is arranged inclined 45 degrees at its optical axis relative to the polarization axis of transmitting light through the polarizing filter 811a, allowing the light transmitted the polarizing filter 811a to exit with its polarization axis deviated by 90 degrees from that of the incident light. Namely, the light transmitted the polarizing filter 811a is rotated at its polarization axis by 90 degrees and made equal to the polarization of the light transmitted the polarizing filter 811b. Namely, the area 802b not provided with the half-wave plate 821 allows to transmit the light passed the polarizing filter 811b and having the same polarization as the polarizing plate while the area 802a provided with the half-wave plate 821 allows to exit the light passed the polarizing filter 811a and orthogonal in polarization axis to the polarizing plate 803 with such a rotation that it is equal in polarization axis to the polarizing plate 803.

The repetition of polarization characteristic on the fine-phase-difference plate is provided at nearly the same pitch as the display units of the liquid-crystal display panel 804 so that the transmitting light is different in polarization on a display-unit basis (i.e. line by line in a vertical direction of display unit). Accordingly, this makes different the polarization characteristic of fine-phase-difference plate 802 corresponding, on a vertical-line (scanning line) basis, to the display unit of the liquid-crystal display panel 804, thus making different light exit directions on a vertical-line basis.

Otherwise, the repetition of polarization characteristic on the fine-phase-difference plate 802 is provided at a pitch integer times the pitch of display unit of the liquid-crystal display panel 804, to change the polarization characteristic of the fine-phase-difference plate 802 on the basis of every set of plural display units (i.e. on a vertical line basis of every set of plural display units), thereby making a setting such that transmitting light is different in polarization on the basis of every set of plural display units. Accordingly, the polarization characteristic of the fine-phase-difference plate 802 is made different on the basis of every set of plural vertical lines (scanning lines) of the display unit of the liquid-crystal display panel 804, making the light exiting directions different on the basis of every set of plural vertical lines.

In this manner, because of the need to project the light different by repetition of polarization characteristic of the fine-phase-difference plate to the display element (vertical line) of the liquid-crystal display panel 804, the light transmitted the fine-phase-difference plate 802 and projected to the liquid-crystal display panel 804 must be suppressed from spreading left and right.

Namely, the area 802a of the fine-phase-difference plate 802, for changing the phase of light, allows the light transmitted the polarizing filter 811a to transmit with a polarization equal to that of light transmitted the polarizing filter 811b. Meanwhile, the area 802b of the fine-phase-difference plate 802, not to change the phase of light, allows the light transmitted the polarizing filter 811b to transmit as it is. The light exited the fine-phase-difference plate 802 is provided the same polarization as the light transmitted the polarizing filter 811b, to enter the polarizing plate 803 provided on a side close to the light source with respect to the liquid-crystal display panel 804.

The polarizing plate 803 has a polarization characteristic to transmit the same polarized light as the light transmitted the fine-phase-difference plate 802. Namely, the light transmitted the polarizing filter 811b transmits the polarizing plate 803 while the light transmitted the polarizing filter 811a is rotated at its polarization axis by 90 degrees and transmitted through the polarizing plate 803. Meanwhile, the polarizing plate 805 has a polarization characteristic to transmit the polarized light 90-degree different from the polarizing plate 803.

The fine-phase-difference plate 802 and the polarizing plate 803, explained above, are structured by being bonded together. This is to function as a vertical-striped-patterned filter provided horizontally with the first areas to transmit a particular polarization of light as it is and the second areas to transmit a polarized light whose polarization axis is perpendicular to the particular polarization light with its polarization axis rotated by 90 degrees. Those areas are arranged alternately in the horizontal direction.

The fine-phase-difference plate 802, polarizing plate 803 and polarizing plate 805 thus structured is bonded with the liquid-crystal display panel 804, to structure an image display by the combination of the fine-phase-difference plate 802, the polarizing plate 803, the liquid-crystal display panel 804 and the polarizing plate 805. At this time, because the liquid-crystal molecules of the liquid-crystal display panel 804 are aligned in a state voltage is applied to the liquid crystal, the light transmitted the fine-phase-difference plate 802 is to transmit the polarizing plate 805. Meanwhile, in the state no voltage is applied to the liquid crystal, because the liquid-crystal molecules of the liquid-crystal display panel 804 are aligned twisted 90 degrees, the light transmitted the fine-phase-difference plate 802 is allowed to exit the liquid-crystal display panel 804 with its polarization twisted 90 degrees so that it does not transmit the polarizing plate 805.

Incidentally, in front of the polarizing plate 805 (on a side closer to the observer), a diffuser may be provided which is to vertically diffuse the light transmitted the liquid-crystal display panel. The diffuser is structured by a lenticular lens, which is structured by arranging to vertically repeat horizontally-extending semi-cylindrical lenses on a surface, having the other surface made flat. This is attached on the front surface of the polarizing plate 805 such that the microstructured surface directs toward the observer while the flat surface toward the liquid-crystal display panel 804. Accordingly, the light, transmitted the liquid-crystal display panel 804 and entered into the diffuser, is refracted by the microstructures into vertical diffusion in light path, thus radiated toward the observer.

Figure 11:
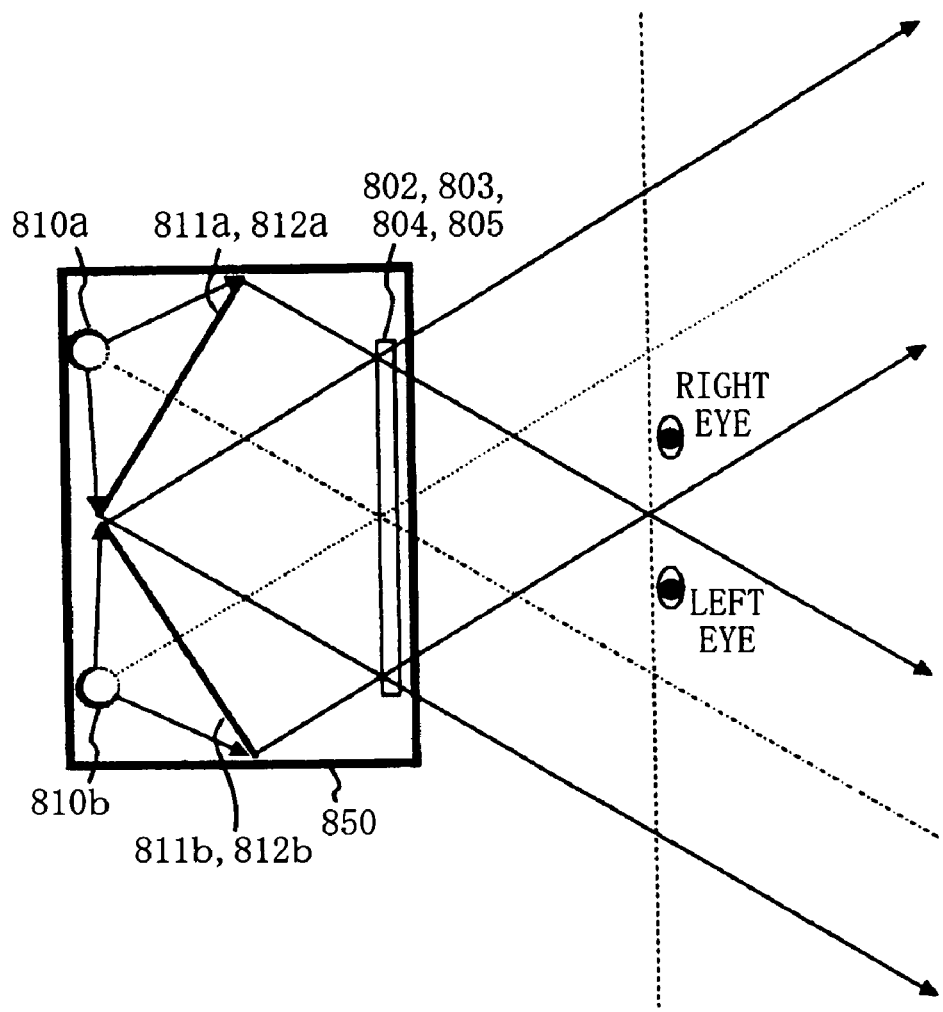
FIG. 11 is a plan view of an optical system of the image display in a second embodiment of the invention.

FIG. 11 is a plan view showing an optical system of the image display in the second embodiment of the invention.

The light, emitted from a light-emitting element 810a of a first light source 801a (optical path center being shown by the one-dot chain line), spreads radially to reach a polarizing filter 811a and Fresnel lens 812a. In the Fresnel lens 812a, it is refracted into collimated light to reach a fine-phase-difference plate 802 where it transmits an area 802a of the fine-phase-difference plate 802 (for transmitting the light transmitted the polarizing filter 811a) for to rotate its polarization by 90 degrees to exit. Furthermore, it transmits nearly vertically (from somewhat right to left) the polarizing plate 803, liquid-crystal display panel 804 and polarizing plate 805 thus reaching the left eye. Namely, it reaches the left eye the left-eye image displayed by the display element in a position corresponding to the area 802 of the liquid-crystal display panel 804.

The areas 802b, arranged alternately with the areas 802a of the fine-phase-difference plate 802, are not to transmit the light transmitted the areas 802a but to transmit the light differently polarized from the light transmitted the area 802a (those lights having polarization axes orthogonal with each other). Accordingly, the right-eye image, displayed on the display element in a position corresponding to the area 802b of the liquid-crystal display panel 804, does not reach the left eye.

Meanwhile, the light, emitted from the light-emitting element 810b of the second light source 801b (the centerline of the light path shown by the broken line), spreads radially to reach the polarizing filter 811b and Fresnel lens 812b where the light is refracted into collimated light by the Fresnel lens 812b, to reach the fine-phase-difference plate 802. By transmitting the area 802b of the fine-phase-difference plate 802 for transmitting the light having the same polarization of the polarizing filter 811b, the light transmits the liquid-crystal display panel 804 and polarizing plate 805 nearly vertically (from somewhat left to right) thus reaching the right eye. Namely, the right-eye image, displayed on the display element in a position corresponding to the area 802b of the liquid-crystal display panel 804, reaches the right eye.

Because the areas 802a arranged alternately with the areas 802b of the fine-phase-difference plate 802 are to change the polarization of light, the light from the polarizing filter 811b is not to transmit the polarizing plate 803. Thus, the left-eye image, displayed on the display element in a position corresponding to the area 802a of the liquid-crystal display panel 804, does not reach the right eye.

In this manner, the light, emitted from the light-emitting elements 810a, 810b and different in polarization, is projected nearly vertically to the liquid-crystal display panel 804 by means of the Fresnel lenses 812a, 812b as optical means. Namely, by means of the first light source 801a (light-emitting element 810a, polarizing filter 811a, Fresnel lens 812a) and the second light source 801b (light-emitting element 810b, polarizing filter 811b, Fresnel lens 812b), a light source is constituted to project the collimated light different in polarization plane to the liquid-crystal display panel 804 through different paths, thereby causing the light transmitted the liquid-crystal display panel 804 to exit through different paths and reach the right or left eye. Namely, by providing equal between the scanning line pitch on the liquid-crystal display panel 804 and the repetition pitch of polarization characteristic on the fine-phase-difference plate 802, projected is the incoming light in different directions based on a scanning-line-pitch basis of the liquid-crystal display panel 804, to exit the light in different directions.

The embodiments disclosed this time are merely exemplifications and not limitative in every respect. The scope of the invention is shown not by the invention explained so far but by the claims, intentionally including every modification within the scope of the meaning and content equivalent to the claims.

The invention claimed is:
1. An image display comprising:
  a liquid-crystal display panel which transmits light projected from a rearward direction;
  a light source for projecting a first light as a particular polarization of light and a second light, whose polarization axis is orthogonal to the polarization axis of the first light, to the liquid-crystal display panel;
  optical means for refracting light emitted from the light source to reach left and right respective eyes;
  a stripe-patterned filter arranged between the liquid-crystal display panel and the light source and having, repeatedly in a given direction, first areas for transmitting the first light and second areas for transmitting the second light;

a polarizing plate having a polarizing characteristic which blocks light transmitted through the liquid-crystal display panel either during supplying of power or during non-supplying of power to the liquid-crystal display panel;

wherein the light source is structured by including light emitters for emitting red, green and blue lights, to sequentially emit red, green and blue lights, wherein images corresponding to respective colors are sequentially displayed on the liquid-crystal display panel correspondingly to emission timing of the respective colors of light by the light emitters, wherein the light emitters are structured by arranging light-emitting elements based on each of the colors, wherein each light-emitting element emits light, which depending on a color of the emitted light, is refracted at a different respective angle by the optical means; and wherein the light-emitting elements for emitting red, green and blue lights are, respectively, arranged in that order inward toward a centerline of the image display.

2. An image display according to claim 1, wherein emission time of each color of light by the light source is dependent upon a brightness of the color.

3. A game machine comprising:

an image display provided with a display area for variably displaying a plurality of pieces of identification information, and a variable display control means for control of variable display of the identification information, to perform a variable display game that the identification information displayed on the image display is variably displayed to cause a special game state for providing a special game value related to a result form of the variable display game, wherein the image display uses an image display according to claim 1 or claim 2.

* * * * *

UNITED STATES PATENT AND TRADEMARK OFFICE
CERTIFICATE OF CORRECTION

PATENT NO. : 7,355,658 B2
APPLICATION NO. : 10/548366
DATED : April 8, 2008
INVENTOR(S) : Sadao Ioki It is certified that error appears in the above-identified patent and that said Letters Patent is hereby corrected as shown below:

Column 10, lines 22, 24 and 39 insert --by-- after "transmitted".

Column 11, lines 18, 20, 22, 60, 65 and 67 insert --by-- after "transmitted".

Column 12, lines 5, 9, 11, 12, 40, 46 and 53 insert --by-- after "transmitted".

Column 12, line 36 insert --by-- after "transmit".

Column 13, lines 8, 12, 39 and 54 insert --by-- after "transmitted".

Column 13, lines 12, 31 and 42 insert --by-- after "transmit".

Column 13, line 66 insert --by-- after "transmitting".

Column 14, line 1 insert --by-- after "transmitting".

Column 14, lines 6, 7, 10, 25, 26 and 29 insert --by-- after "transmits".

Column 14, lines 19 and 37 insert --by-- after "transmit".

Column 14, lines 58, 60 and 67 insert --by-- after "transmitted".

Column 17, lines 5, 7, 27 and 34 insert --by-- after "transmit".

Column 17, lines 20, 21, 26 and 32 insert --by-- after "transmitted".

Column 18, lines 7, 9, 11, 49, 54, 65 and 67 insert --by-- after "transmitted".

Column 18, line 67 insert --by-- after "transmit".

Column 19, lines 24, 28, 34, 42, 65 and 66 insert --by-- after "transmitted".

Column 19, lines 25 and 31 insert --by-- after "transmit".

Column 20, line 13 insert --by-- after "transmits".

UNITED STATES PATENT AND TRADEMARK OFFICE
CERTIFICATE OF CORRECTION

PATENT NO. : 7,355,658 B2
APPLICATION NO. : 10/548366
DATED : April 8, 2008
INVENTOR(S) : Sadao Ioki It is certified that error appears in the above-identified patent and that said Letters Patent is hereby corrected as shown below:

Column 20, line 22 insert --by-- after "transmit".

Signed and Sealed this

Twenty-sixth Day of August, 2008

JON W. DUDAS
*Director of the United States Patent and Trademark Office*